No. 879,566. PATENTED FEB. 18, 1908.
A. W. MITCHELL.
LANTERN HOLDER.
APPLICATION FILED JAN. 28, 1907.
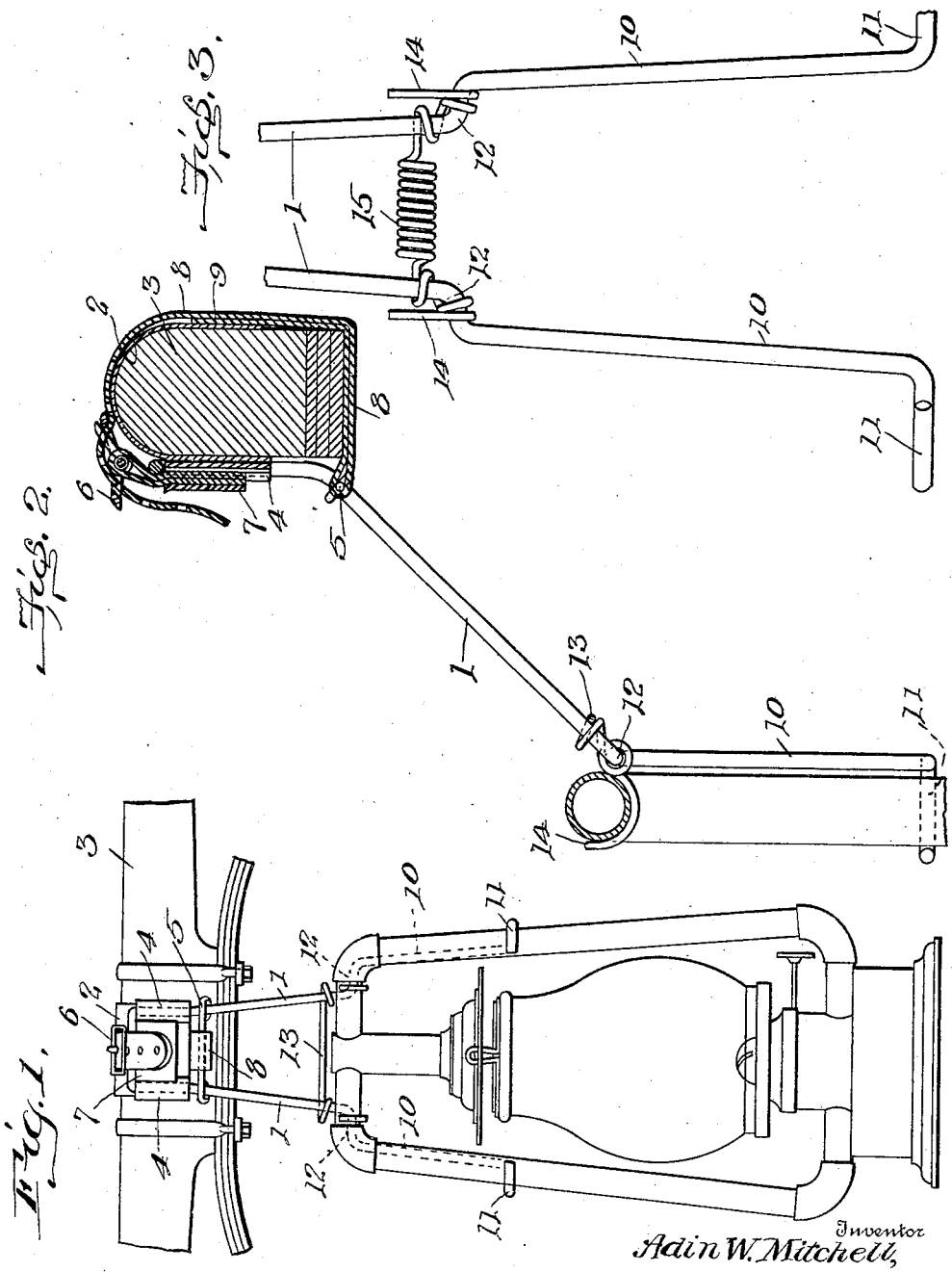
Witnesses
G. Howard Walmsley,
Edward L. Reed
Inventor
Adin W. Mitchell,
By H. A. Toulmin,
Attorney

UNITED STATES PATENT OFFICE.

ADIN W. MITCHELL, OF GEORGETOWN, OHIO.

LANTERN-HOLDER.

No. 879,566.  Specification of Letters Patent.  Patented Feb. 18, 1908.

Application filed January 28, 1907. Serial No. 354,418.

*To all whom it may concern:*

Be it known that I, ADIN W. MITCHELL, a citizen of the United States, residing at Georgetown, in the county of Brown and State of Ohio, have invented certain new and useful Improvements in Lantern-Holders, of which the following is a specification, reference being had therein to the accompanying drawings.

The present invention relates to lantern holders for supporting a lantern from the running gear or other part of a vehicle. Devices of this character, as at present constructed, are for the most part adapted to support the lantern from the dash-board of the vehicle, but this arrangement throws the light mostly upon the horse and does not properly light up the road in front of it, while other devices for supporting the lantern from beneath the vehicle are inconvenient of access, rendering it difficult to attach and detach the lantern.

The object of the present invention is to avoid this difficulty by providing means for attaching the lantern to the spring bar of the vehicle and suspending the same beneath the level of the vehicle so that the light therefrom will be thrown in front of the horse, lighting up the road in front of the vehicle, as well as at the sides thereof, and which will be easy of access, thereby enabling the lantern to be readily attached to and detached from the vehicle.

With these objects in view the present invention consists of certain novel features of construction to be hereinafter described, and then more fully pointed out in the claims.

In the accompanying drawings, Figure 1 is a front elevation of a lantern-holder constructed in accordance with my invention, with a lantern in position; Fig. 2 is a transverse sectional view of the same; and Fig. 3 is a detail view of a modified form of the cross connection for the supporting arms.

In these drawings, I have shown the preferred embodiment of my invention which consists of a pair of supporting arms 1, preferably formed of a single piece of heavy wire, and provided at their ends with suitable means for securing the same to the spring bar or other convenient part of the running gear of the vehicle. The preferred form of attaching means which I have here shown consists in providing a metal plate or clip 2 bent to fit over the spring bar 3, and in providing this clip on one face with lips 4 adapted to be bent about the arms 1 and secure the clip 2 to said arms. A bar 5, preferably in the form of a wire, extends between the arms immediately below the clip 2 and is rigidly secured thereto. The clip 2 is provided on its rear side, or the side which is secured to the arms 1, with a buckle 6 which is preferably secured thereto by a flexible connection 7. A strap 8 is secured to the clip 2 at the side opposite that side which is secured to the arms, as shown at 9, and is adapted to extend down beneath the spring bar, about the cross bar 5, thence to be doubled back upon itself and extend up over the spring bar and to be engaged with the buckle 6, whereby the clip is firmly secured to the spring bar and the supporting arms 1 rigidly supported therefrom.

The arms 1 extend downwardly and forwardly from the attaching clip 2 a distance sufficient to support the lantern in the desired position relatively to the vehicle. The lower ends of the arms 1 are bent first outwardly at substantially right angles to the arms 1 to form a shoulder 12, and thence downwardly, as shown at 10, so that they occupy a substantially vertical position and have their lower ends bent at right angles thereto and curved outwardly to form hooks 11 to engage the side members of the lantern frame, but, if desired, any other suitable engaging means may be supplied at the lower ends of the arms 10 to engage the side members of the lantern.

The arms 1 are provided, preferably immediately above the shoulders 12, with a cross connection 13, which is preferably in the form of a wire extending between the inclined portions of the arm 1 and coiled about the same; thence extending downwardly and coiled about the shoulders 12; thence outwardly and curved downwardly to form hooks 14 adapted to engage the upper member of the lantern frame. This cross connection may be formed of rigid material, as shown in Fig. 1, but, if desired for the purpose of obtaining greater resiliency of the arms 10, the central portion of the wire forming the cross connection may be in the form of a coiled spring, as shown at 15 in Fig. 3, thus increasing the spring action of the arms 10.

From the foregoing description it will be seen that I have provided a lantern support which can be readily attached to the vehicle and which, when so attached, will support the lantern in such a position that it will throw the light upon the road in front of the vehicle, and, further, that this support is provided with means for firmly supporting the lantern, the hooks 14 being adapted to carry the weight of the lantern, while the arms 10 which are resilient are adapted to be sprung outwardly to allow the hooks 11 to engage the side members of the lantern and then grip the same firmly to prevent any swaying motion of the lantern.

I wish it to be understood that I do not desire to be limited to the exact details of construction shown and described, for obvious modifications will occur to a person skilled in the art.

Having thus fully described my invention, what I claim as new and desire to secure by Letters Patent, is:—

1. A lantern holder comprising two wires having at their upper ends an attachment device for connecting with the vehicle, a cross connection between said wires at a point intermediate their ends, spring arms extending downward from the point of cross connection and provided at their lower ends with hooks to engage the lantern frame, and additional hooks extending from said wires near the point of said cross connection to engage the upper part of the lantern frame.

2. A lantern holder comprising a pair of supporting arms having downwardly inclined portions and vertical portions extending downwardly from the lower ends thereof, means near the upper ends of said arms for securing the same to the vehicle, hooks near the lower ends of said vertical portions adapted to engage the side members of a lantern, a cross connection between said arms near the upper ends of said vertical portions, and hooks secured to said arms near the point of cross connection and adapted to engage the upper end of said lantern frame.

3. A lantern holder comprising a pair of supporting arms having downwardly inclined portions and vertically extending portions, horizontal portions connecting said inclined portions with said vertical portions, a cross member extending between said arm and around said horizontal portion and having hooks formed at the ends thereof adapted to engage the upper portion of the lantern frame, and hooks near the lower ends of said vertical portions adapted to engage the side members of said lantern frame, and means for securing said arms to the vehicle.

4. A lantern holder comprising a pair of supporting arms, means near the upper ends of said arms for attaching the same to the vehicle, a spring secured to and extending between said arms intermediate their ends, hooks secured to said arms near their point of connection with said spring and adapted to engage the upper portion of a lantern frame, and downwardly extending portions carried by said arms and provided with hooks near their lower ends adapted to engage the side members of said lantern frame.

5. A lantern support comprising a pair of supporting arms, a plurality of hooks carried by said arms and adapted to engage the lantern frame, a clip secured to the upper end of said arm and adapted to engage a portion of the vehicle, a bar extending between said arms near the lower end of said clip, a strap secured to said clip and extending beneath that portion of the vehicle frame engaged by said clip, around said bar, thence upward over said clip, and a buckle carried near the upper end of said arms adapted to engage said strap.

In testimony whereof, I affix my signature in presence of two witnesses.

ADIN W. MITCHELL.

Witnesses:
J. N. MYERS,
E. H. KIRKPATRICK.